United States Patent
Messih et al.

[11] Patent Number: 5,546,910
[45] Date of Patent: Aug. 20, 1996

[54] AIR/FUEL CONTROLLER WITH COMPENSATION FOR SECONDARY INTAKE THROTTLE TRANSIENTS

[75] Inventors: Isis A. Messih, Troy; Mark T. Linenberg, Romulus, both of Mich.

[73] Assignee: Ford Motor Company, Dearborn, Mich.

[21] Appl. No.: 498,827

[22] Filed: Jul. 6, 1995

[51] Int. Cl.$^6$ ............................. F02D 41/10; F02D 41/12
[52] U.S. Cl. ........................................ 123/492; 123/493
[58] Field of Search ............................ 123/480, 492, 123/493

[56] References Cited

U.S. PATENT DOCUMENTS 5,134,983  8/1992  Kusunoki et al. ................. 123/492
5,353,768  10/1994  Messih et al. ..................... 123/491
5,413,078  5/1995  Mitsunaga et al. ................ 123/492

Primary Examiner—Tony M. Argenbright
Attorney, Agent, or Firm—Allan J. Lippa; Roger L. May

[57] ABSTRACT

An Electronic Engine Controller (EEC) controls the fuel delivery to an intake of an engine which is equipped with an intake system which includes primary and secondary runners, a primary throttle plate for controlling air flow through both runners and a secondary throttle plate for controlling air flow through the secondary runner. The EEC determines values indicative of the actual and equilibrium amounts of fuel existing in the intake system and controls the fuel delivery based on such values. The actual and equilibrium amounts of fuel include a value indicative of the change in equilibrium fuel due to change in the secondary throttle position.

9 Claims, 3 Drawing Sheets

AIR/FUEL CONTROLLER WITH COMPENSATION FOR SECONDARY INTAKE THROTTLE TRANSIENTS

FIELD OF THE INVENTION

This invention relates generally to the field of electronic engine controls and more particularly to compensating for induction system wetting effects during transient engine operation.

BACKGROUND OF THE INVENTION

Engines which utilize electronically controlled secondary throttles offer improved air flow control by allowing rapid and precise adjustments to the air flow rate in the intake manifold. Typically, such secondary throttles are positioned downstream of a primary, driver controlled throttle, and operate under control of an electronic controller.

The applicants herein have discovered that during cold engine operation, particularly during transients, the dynamics of the secondary throttle causes changes in the amount of fuel remaining in the intake manifold. These variations cause fluctuations in the air/fuel ratio in the combustion chambers of the engine, which may result in reduced power and/or increased emissions.

Accordingly, it is an object of the present invention to provide an engine controller which accounts for the dynamics of a secondary throttle during transient operation, and particularly during cold engine operation.

SUMMARY OF THE INVENTION

In a principal aspect of the invention, an internal combustion engine includes an intake system which includes primary and secondary runners, a primary throttle plate for controlling air flow through both the runners, and a secondary throttle plate for controlling air flow through the secondary runner. Injectors means deliver fuel to the combustion chamber in an amount controlled by a fuel injector signal generated by an engine control means. The delivery of fuel to the intake port during transient engine operation is controlled by determining an equilibrium fuel mass value which is indicative of the fuel mass on the walls of the intake system when the engine is operating under steady state conditions, as a function of an intake runner value which is indicative of a change in the fuel mass on the walls of the intake system due to movement of the secondary intake throttle plate from a first position to a second position. An actual fuel mass value, which is indicative of the actual fuel film mass residing on the walls of the intake system when the engine is operating under transient conditions, is then determined as a function of a prior actual fuel mass value, and an equilibrium fuel transfer rate value, which is indicative of a transfer rate of fuel from the walls of the intake system to a combustion chamber of the engine. The fuel injector signal is then generated as a function of the equilibrium fuel mass value and the actual fuel mass value.

An advantage of certain preferred embodiments is that bumps and sags which may be felt during secondary throttle transient engine operation, particularly when the engine is cold, are reduced by compensating for the differing amount of fuel in the intake port.

These and other features and advantages of the present invention may be better understood by considering the following detailed description of a preferred embodiment of the invention. In the course of this description, reference will frequently be made to the attached drawings.

DETAILED DESCRIPTION

Figure 1:
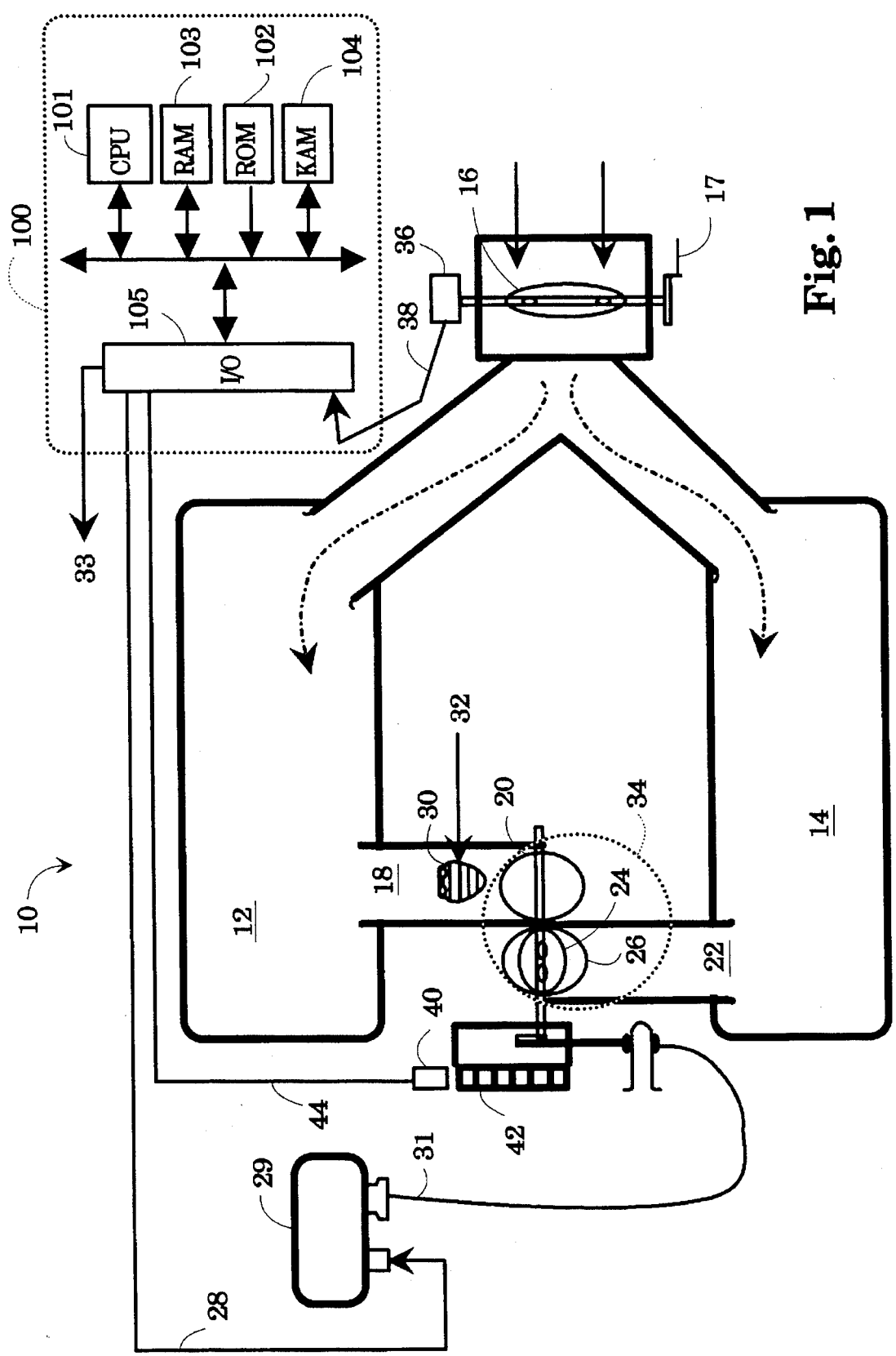
FIG. 1 of the drawings is a schematic illustration of a preferred embodiment.

FIG. 1 shows a schematic view of a single cylinder of a multi-cylinder engine and engine controller which embody the principles of the invention. In FIG. 1 of the drawings an internal combustion engine 10 employs dual plenums seen at 12 and 14 respectively. A primary throttle plate 16, which operates under driver operated control via a primary throttle cable 17, controls the amount of air entering the plenums 12 and 14. Air passing through plenum 12 is drawn through a primary runner 18 and into primary intake valve 20. Air passing through plenum 14 is drawn through secondary runner 22, past secondary throttle plate 24 and into secondary intake valve 26. Secondary throttle plate preferably takes the form of an electronically controlled throttle plate, the position of which is determined by a secondary throttle position signal 28 generated by Electronic Engine Controller (EEC) 100. The secondary throttle position signal 28 is transmitted to an electronic throttle actuator 29 which alters the position of the secondary throttle plate via a secondary throttle cable 31. A fuel injector 30 operates under control of a fuel injector signal 32 generated by EEC 100 to inject fuel into primary runner 18 for combustion in combustion chamber 34.

EEC 100 preferably includes a central processing unit 101, a read-only memory (ROM) 102 for storing control programs, a random-access memory (RAM) 103 for temporary data storage, a keep-alive-memory (KAM) 104 for storing learned values, and a conventional data bus and I/O ports 105 for transmitting and receiving signals to and from engine 10.

A throttle position sensor 36 which preferably takes the form of a rotary potentiometer, detects the position of primary throttle plate 16 and transmits a throttle position signal 38 to EEC 100. A Profile Ignition Pickup (PIP) sensor 40 detects the rotation of a 36-tooth wheel 42 mounted on an engine crankshaft (not shown) and generates a PIP signal 44 which takes the form of a series of pulses. The PIP signal 44 contains information both as to crankshaft position, indicated by the occurrence of a pulse, and crankshaft speed, indicated by the frequency of the pulses.

Engines utilizing an Intake Manifold Runner Control System (IMRC) which employ an electronically controlled secondary throttle for each intake runner operate to improve the volumetric efficiency of the engine. When the secondary throttle plate 24 is closed, airflow in the runner 22 is blocked and all airflow is directed through the primary runner 18. When the secondary throttle plate 24 is open, air flows through both the primary and secondary runners.

The secondary throttle, which operates under control of EEC 100 as described above, takes a finite amount of time to change position in both directions; from full open to full closed, and from full closed to full open. The opening and closing rates depend upon the type of throttle control unit. Typical throttle control units are either electrically or vacuum controlled. A preferred vacuum unit typically requires approximately 0.5 seconds to move from a full open to full closed or full closed to full open position. A preferred electric unit requires typically, 0.1–0.3 seconds to open and 0.1–0.4 seconds to close.

The applicants herein have observed that opening of the secondary throttle plate 24 may cause an acceleration sag, or bump, due to a temporary lean air fuel ratio excursion following opening of the secondary throttle. Opening of the secondary throttle causes a decrease in flow mass and air velocity in the primary intake manifold. The total engine airflow entering the combustion chamber however, remains unchanged. The slower airflow through the primary runner 18 results in a decrease in the shear forces which carry the fuel into the cylinder. This in turn, causes an increase in the equilibrium surface fuel, which resides on the walls of the primary intake manifold. The reduced amount of fuel entering the cylinder results in a temporary lean mixture until a new equilibrium state is reached. The resulting lean air/fuel mixture in the combustion chamber may cause a lean burn or misfire and may result in a loss of torque, which can be felt as a sag or bump during acceleration. This problem has been observed to be more prevalent during cold engine operation. A temporary rich air/fuel mixture has been observed when the secondary throttle closes.

Figure 2:
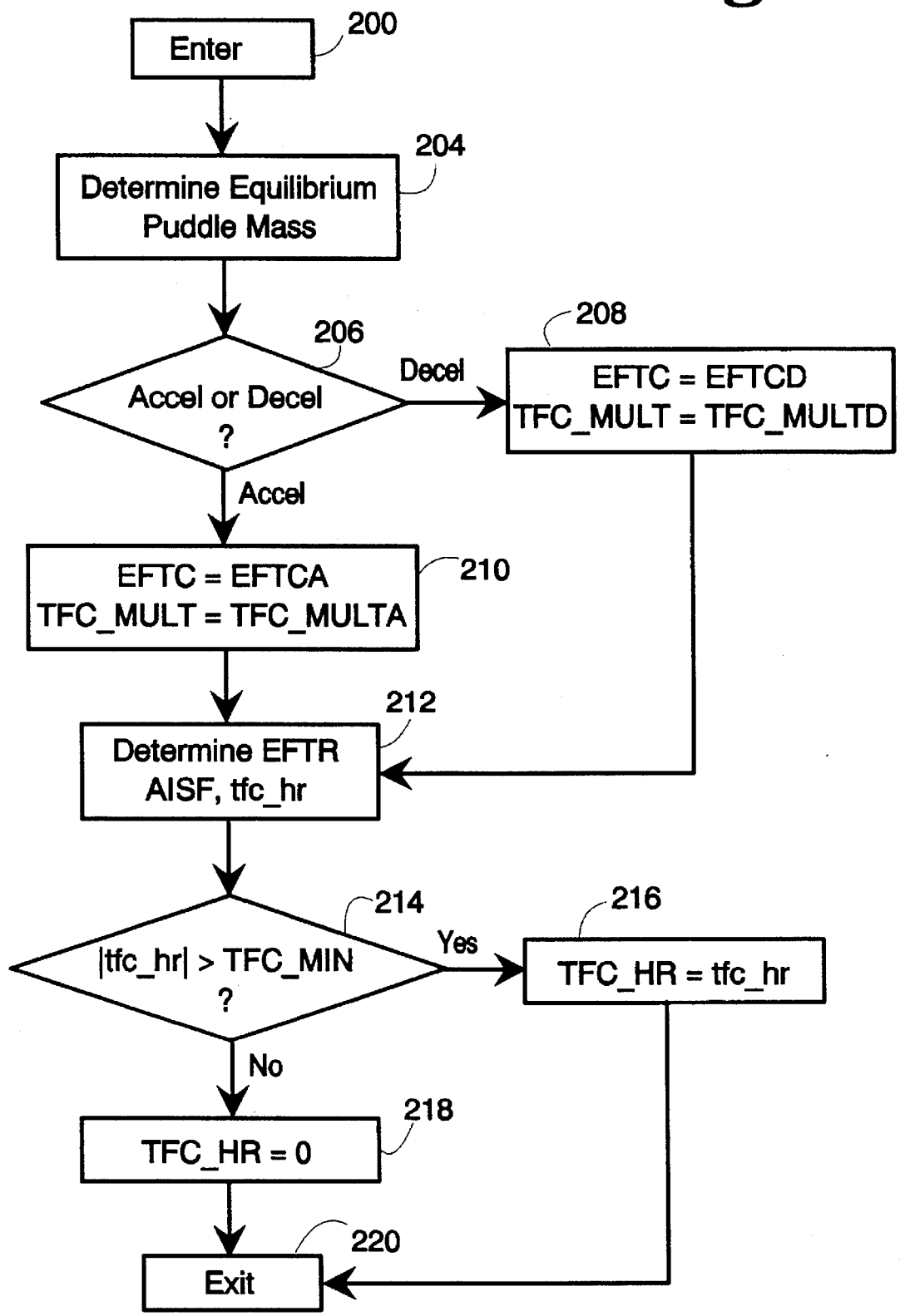
FIGS. 2 and 3 are flowcharts illustrating the operation of a preferred embodiment.
Figure 3:
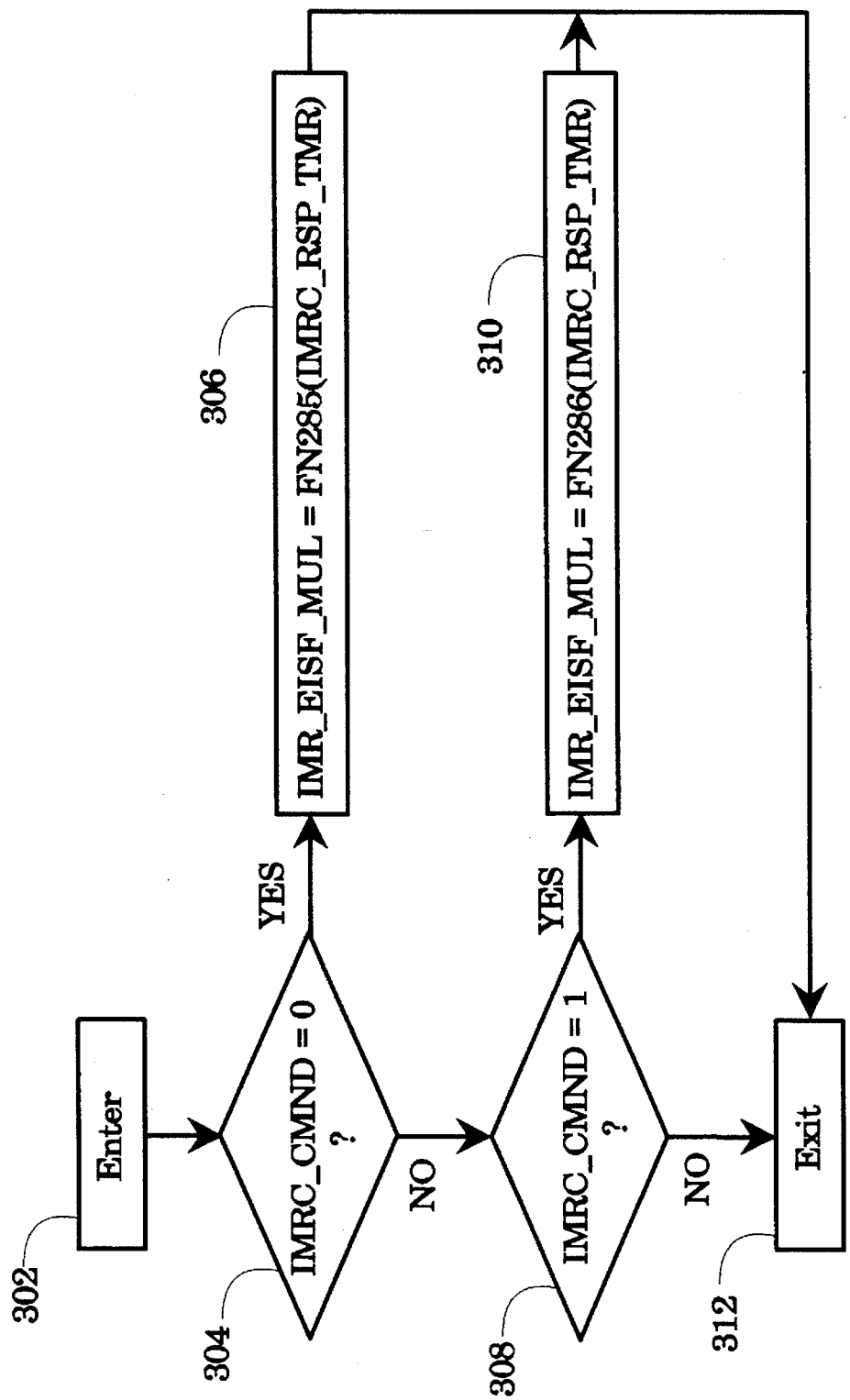

A preferred embodiment advantageously compensates for the change in the amount of fuel residing on the walls of the primary runner 18 which occurs during opening or closing of the secondary throttle plate 24. FIGS. 2 and 3 are flowcharts showing the steps of an IMRC compensation routine which compensates for the change in fuel mass on the walls of the intake runner during transient engine operation. The IMRC compensation routine is preferably implemented as a stored program which is executed by EEC 100.

FIG. 2 of the drawings shows a foreground routine which is executed once every cylinder firing as part of an interrupt driven routine. The routine is entered at step 200 and at step 204 an equilibrium puddle mass value EISF_FG, which is indicative of the fuel mass residing on the walls of the intake system at equilibrium is determined by updating a background EISF value which is generated in a manner to be explained. EISF_FG is updated according to the following relationship:

$$(EISF\_FGU, EISF\_FGL) = (EISFU, EISFLO) + [(CYL\_AIR\_CHG\_TFC\_CHG) * TFC\_SLOPE]$$

where,

EISF_FGU, EISF_FGL are upper and lower words which together form EISF_FG;

EISFU, EISFLO are upper and lower words which together form the background EISF value which is indicative of the fuel mass residing on the walls of the primary runner at equilibrium as determined in a manner to be explained;

CYL_AIR_CHG is a value which is indicative of cylinder air charge in pounds per minute;

TFC_CHG is a background aircharge value which is indicative of the cylinder air charge in pounds per minute existing when the values EISFU and EISFLO were determined; and TFC_SLOPE is a fuel puddle mass value which is indicative of the change in the fuel mass residing on the walls of the primary runner per change in aircharge and is generated in a manner to be described.

Upper and lower words EISF_FGU, EISF_FGL, EISFU and EISFLO are each sixteen bit values used to preserve computing accuracy. The final values EISF_FG and EISF correspond to EISF_FGU and EISFU respectively, once calculation of EISF_FGU, EISF_FGL, EISFU and EISFLO is complete.

At step 206, an accel/decel check is performed to determine if the engine is accelerating or decelerating. This check is preferably performed by comparing EISF to a value AISF which is indicative of the actual fuel mass residing on the walls of the primary runner. EISF being greater than AISF indicates that the engine is under acceleration and AISF being greater than EISF indicates that the engine is under deceleration. A preferred embodiment advantageously accounts for differences in the change in the fuel puddle mass during acceleration and deceleration by utilizing different compensation values for acceleration and for deceleration. At step 208, a deceleration transient fuel multiplier TFC_MULTD and a deceleration time constant EFTCD are utilized and at step 210 corresponding values for acceleration are utilized. The transient fuel multiplier TFC_MULT is indicative of the effect of intake valve temperature on the vaporization rate of fuel in the primary runner and the time constant EFTC is indicative of a rate of change of the fuel puddle in the primary runner.

At step 212, an equilibrium fuel transfer rate value EFTR which is indicative of an equilibrium transfer rate of fuel from the walls of the primary runner to the combustion chamber is generated according to the following relationship:

$$EFTR = ((HSF\_FGU, EISF\_FGL) - (AISFU, AISFLO))/EFTC$$

where,

EISF_FGU and EISF_FGL are as explained above;

AISFU, AISFLO are as described below; and

EFTC is either EFTCA or EFTCD as explained above. The value AISF which is indicative of the actual fuel film mass residing on the walls of the primary runner is determined at step 212 according to the following relationship:

$$(AISFU, AISFLO) = (AISFU, AISFLO) + (EFTR*DT12S*T\_TO\_S)$$

where,

AISFU, AISFLO are sixteen bit words used to preserve computing accuracy. The value AISF corresponds to AISFU once calculation of AISFU and AISFLO is complete;

EFTR is as described above;

DT12S is indicative of the period of time between two adjacent rising edges of PIP signal 44 in units of processor clock ticks; and T_TO_S is a conversion factor used to convert processor clock ticks to real time.

Finally at step 212 an intermediate transient fuel compensation value TFC_HR is generated according to the following relationship:

$$TFC\_HR = EFTR*TFC\_MULT$$

At steps 214, 216 and 218 a transient fuel compensation value TFC_HR is generated as a function of the intermediate transient fuel compensation value by comparing the magnitude of TFC_HR at 214 to a predetermined minimum magnitude TFC_MIN, and if the magnitude of TFC_HR is greater than TFC_MIN then setting the transient fuel compensation value equal to the intermediate transient fuel compensation value at step 216. Otherwise, the transient fuel compensation value is set to zero at step 218, resulting in no compensation of the fuel injection quantity for changes in the equilibrium fuel mass. This advantageous feature eliminates insignificant changes to the fuel quantity, and corrects the fuel quantity only when the amount of compensation required is above a predetermined minimum. The foreground routine is then exited at step 220.

Generation of the background values used in the foreground routine shown in FIG. 2 will now be described. A more detailed explanation of the functions performed by the background routine is provided in U.S. Pat. No. 5,353,768 entitled Fuel Control System with Compensation for Intake Valve and Engine Coolant Temperature Warm-Up Rates, which is assigned to the assignee of the present application and which is hereby incorporated by reference.

The background value EISF is determined from upper EISF word EISFU according to the following relationship:

$$(EISFU, EISFLO)=FN1321(ECT, LOAD)*FN313(N)*MTEISF*IMR\_EISF\_MUL$$

where,

EISFU, EISFLO are as previously described;

FN1321 (ECT, LOAD) is a value obtained from a table contained in ROM 102 in which are stored predetermined values indexed by the variables ECT representative of engine coolant temperature, and LOAD representative of engine load;

FN313(N) is a value representative of an equilibrium intake surface fuel multiplier at a particular engine speed, N;

MTEISF is a predetermined multiplicative constant; and

IMR_EISF_MUL is a multiplier which is determined in a manner described below.

The value of IMR_EISF_MUL is generated from one of two functions depending upon whether the secondary throttle is opening or closing. The value of IMR_EISF_MUL is ramped over the period of time required for the secondary throttle to open or close. Once the secondary throttle is in an open or closed position, the value of IMR_EISF_MUL reached upon the opening or closing of the throttle is maintained, until the position of the secondary throttle is changed.

FIG. 3 of the drawings shows the steps executed to determine the value of IMR_EISF_MUL. At step 304, a secondary throttle command flag, IMRC_CMND is checked to determine if the secondary throttle is being commanded to close (IMRC_CMND=0). Once closed, IMRC_CMND remains at zero until the throttle is commanded to open, at which point IMRC_CMND has a value of one. IMRC_CMND remains at one until the secondary throttle is commanded to close. If the IMRC_CMND equals zero, then at step 306, IMR_EISF_MUL is generated according to the function FN285(IMRC_RSP_TMR), which is a throttle close response time value which is indicative of the time required for the secondary throttle to close from an open position. This value is preferably retrieved from a table stored in ROM which contains a plurality of values indexed by IMRC_RSP_TMR which indicates the time elapsed in seconds from the most recent command issued by the EEC to change the position of the secondary throttle plate. If at step 304, IMRC_CMND equals one, then at step 308, IMRC_CMND is checked to determine if the secondary throttle is being commanded to open. If so, then at step 310, IMR_EISF_MUL is generated according to the function FN286(IMRC_RSP_TMR), which is a throttle open response time value which is indicative of the time required for the secondary throttle to open from a closed position. This value is preferably retrieved from a table stored in ROM which contains a plurality of values indexed by IMRC_RSP_TMR.

The separate equilibrium fuel time constant values for acceleration and deceleration (EFTCA and EFTCD) are determined according to the following relationships:

$$EFTCA=FN1322AL(ECT, LOAD)*MTEFTC$$

$$EFTCD=FN1322DL(ECT, LOAD)* MTEFTC$$

where,

EFTCA and EFTCD are equilibrium fuel time constants for acceleration and deceleration, respectively;

FN1322AL(ECT, LOAD) and FN1322DL(ECT, LOAD) are transient fuel time constant values for acceleration and deceleration respectively, which are obtained from a table contained in ROM 102 in which are stored predetermined values indexed by the variables ECT and LOAD; and MTEFTC is an equilibrium fuel transfer constant multiplier.

TFC_SLOPE is generated according to the following relationship:

$$TFC\_SLOPE=FN3125(ECT)*FN313(N)$$

where,

FN312S (ECT) is a value which is indicative of a change in transient fuel puddle mass per change in aircharge, and which is stored in a table in ROM 102, indexed by ECT; and FN313(N) is as described above.

The values TFC_MULTA and TFC_MULTD are generated according to the following relationships:

$$TFC\_MULTA=FN1323A(ECT, ATMR1)*T\_TO\_S*DT12S$$

$$TFC\_MULTD=FN1323D(ECT, ATMR1)*T\_TO\_S*DT12S$$

where,

FN1323A(ECT, ATMR1) and FN1323D(ECT, ATMR1) are acceleration and deceleration valve effect values, respectively, obtained from tables, indexed by engine coolant temperature and time since engine crank (ATMR1), and stored in ROM 102 which contains a plurality of acceleration and deceleration valve effect values representative of the effect of changing intake valve temperature during engine warm-up on the vaporization of fuel in the induction system when the engine is under acceleration or deceleration; and T_TO_S and DT12S are as explained above.

It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A method for controlling delivery of fuel to an intake port of an intake system in an engine during transient engine operation, comprising the steps of:

determining an equilibrium fuel mass value which is indicative of the fuel mass on the walls of the intake system when the engine is operating under steady state conditions, as a function of an intake runner value which is indicative of a change in the fuel mass on the walls of the intake system due to movement of a secondary intake throttle plate from a first position to a second position;

determining an actual fuel mass value, which is indicative of the actual fuel film mass residing on the walls of the intake system when the engine is operating under transient conditions, as a function of a prior actual fuel mass value, and an equilibrium fuel transfer rate value which is indicative of a transfer rate of fuel from the walls of the intake system to a combustion chamber of the engine; and generating a fuel injector signal as a function of said equilibrium fuel mass value and said actual fuel mass value.

2. The method as set forth in claim 1 wherein the intake system includes primary and secondary runners, a primary throttle plate for controlling air flow through both of said runners, said secondary throttle plate controlling air flow through said secondary runner, wherein said step of determining said equilibrium fuel mass value comprises the step of determining if said secondary throttle plate is opening or closing and generating said intake runner value as a function of a runner closing value which is indicative of an amount of time required for said secondary throttle plate to move from an open position to a closed position if said secondary throttle plate is closing and generating said intake runner value as a function of a runner opening value which is indicative of an amount of time required for said secondary throttle plate to move from a closed position to an open position if said secondary throttle plate is opening.

3. The method as set forth in claim 2 wherein said runner closing value is gradually changed to a final close value over a period of time substantially equal to the period of time required for said secondary throttle plate to move from an open position to a closed position and is maintained at said final close value when said secondary throttle plate reaches said closed position, and wherein said runner opening value is gradually changed to a final open value over a period of time substantially equal to the period of time required for said secondary throttle plate to move from a closed position to an open position and is maintained at said final open value when said secondary throttle plate reaches said open position.

4. In an internal combustion engine including an intake system which includes primary and secondary runners, a primary throttle plate for controlling air flow through both of said runners, and a secondary throttle plate for controlling air flow through said secondary runner, said engine further comprising injector means for delivering fuel to said combustion chamber in an amount controlled by a fuel injector signal generated by an engine control means, a method for controlling delivery of fuel to the intake port during transient engine operation, comprising the steps of:

determining an equilibrium fuel mass value which is indicative of the fuel mass on the walls of the intake system when the engine is operating under steady state conditions, as a function of an intake runner value which is indicative of a change in the fuel mass on the walls of the intake system due to movement of said secondary intake throttle plate from a first position to a second position;

determining an actual fuel mass value, which is indicative of the actual fuel film mass residing on the walls of the intake system when the engine is operating under transient conditions, as a function of a prior actual fuel mass 18 value, and an equilibrium fuel transfer rate value;

determining said equilibrium fuel transfer rate value, which is indicative of an equilibrium transfer rate of fuel from the walls of the intake system to the combustion chamber, as a function of said equilibrium fuel mass value said actual fuel mass value and a time constant which is indicative of a rate of change of the fuel film mass on the walls of the intake system;

generating a transient fuel compensation value in response to the equilibrium fuel transfer rate value; and generating the fuel injector signal in response to the transient fuel compensation value.

5. The method as set forth in claim 4 wherein the step of determining an equilibrium fuel mass value as a function of an intake runner value which is indicative of a change in the fuel mass on the walls of the intake system due to movement of said secondary intake throttle plate from a first position to a second position comprises the additional step of gradually changing said intake runner value from an initial value to a final value over a period of time substantially equal to a period of time required for said secondary throttle plate to move from said first position to said second position, and maintaining said intake runner value at said final value while said secondary throttle plate is at said second position.

6. The method as set forth in claim 4 comprising the additional step of generating said time constant which is indicative of a rate of change of the fuel film mass on the walls of the intake system as a function of a first time constant value if said engine is under an acceleration condition and as a function of a second time constant value if said engine is under a deceleration condition.

7. The method as set forth in claim 6 wherein the step of generating a transient fuel compensation value in response to the equilibrium fuel transfer rate value comprises the further step of comparing said transient fuel compensation value to a minimum compensation value and limiting said transient fuel compensation value if said transient fuel compensation value is less than said minimum compensation value.

8. The method as set forth in claim 7 wherein the step of determining said equilibrium fuel mass value as a function of an intake runner value comprises the further step of generating said equilibrium fuel mass value as a function of a closed intake runner value if said secondary throttle plate is moving from an open to a closed position and generating said equilibrium fuel mass value as a function of an open intake runner value if said secondary throttle plate is moving from a closed to an open position.

9. An electronic engine controller for an internal combustion engine which includes a pair of intake runners for each engine cylinder, said pair of intake runners including a primary runner and a secondary runner, the electronic engine controller comprising:

means, responsive to the air flow into the intake runners, for generating a load value indicative of the load of the engine;

means, responsive to the angular speed of the engine, for generating an rpm value indicative of the angular speed of the engine;

means, responsive to an engine temperature signal, for generating an engine temperature value which is indicative of the temperature of the engine;

means for detecting a transient engine operating condition;

means responsive to said transient engine operating condition comprising, means for generating an equilibrium fuel mass value which is indicative of the fuel mass on the walls of the intake system when the engine is operating under steady state conditions, as a function of an intake runner value which is indicative of a change in the fuel mass on the walls of the intake runners due to movement of a secondary intake throttle plate, positioned in said secondary runner, from a first position to a second position;

means for generating an actual fuel mass value, which is indicative of the actual fuel film mass residing on the walls of the intake system when the engine is operating under transient conditions, as a function of a prior actual fuel mass value, and an equilibrium fuel transfer rate value;

means for generating said equilibrium fuel transfer rate value, which is indicative of an equilibrium transfer rate of fuel from the walls of the intake system to the combustion chamber, as a function of said equilibrium fuel mass value said actual fuel mass value and a time constant which is indicative of a rate of change of the fuel film mass on the walls of the intake system;

means for generating a transient fuel compensation value in response to the equilibrium fuel transfer rate value; and means for generating a fuel injector signal in response to the transient fuel compensation value.

* * * * *